(12) United States Patent
Kuroda et al.

(10) Patent No.: US 7,606,130 B2
(45) Date of Patent: Oct. 20, 2009

(54) INFORMATION RECORDING MEDIUM, AND INFORMATION REPRODUCING APPARATUS AND METHOD

(75) Inventors: Kazuo Kuroda, Saitama (JP); Toshio Suzuki, Saitama (JP)

(73) Assignee: Pioneer Corporation, Tokyo (JP)

( * ) Notice: Subject to any disclaimer, the term of this patent is extended or adjusted under 35 U.S.C. 154(b) by 562 days.

(21) Appl. No.: 10/880,611

(22) Filed: Jul. 1, 2004

(65) Prior Publication Data

US 2005/0018573 A1    Jan. 27, 2005

(30) Foreign Application Priority Data

Jul. 2, 2003  (JP) .............................. 2003-190175

(51) Int. Cl.
    *G11B 7/24*  (2006.01)
(52) U.S. Cl. ................................. 369/53.21; 369/59.25
(58) Field of Classification Search ............. 369/275.4, 369/53.21, 47.27, 275.3, 59.25
    See application file for complete search history.

(56) References Cited

U.S. PATENT DOCUMENTS

| | | | | |
|---|---|---|---|---|
| 5,615,205 | A  * | 3/1997 | Belser ..................... | 369/275.4 |
| 6,209,092 | B1 | 3/2001 | Linnartz | |
| 6,363,041 | B1 | 3/2002 | Timmermans et al. | |
| 6,728,186 | B2 * | 4/2004 | Weijenbergh et al. .... | 369/59.25 |
| 6,735,160 | B1 * | 5/2004 | Miyashita et al. ........ | 369/59.12 |
| 6,778,587 | B1 * | 8/2004 | Malvar et al. ............... | 375/130 |
| 6,801,490 | B1 * | 10/2004 | Sako et al. ............... | 369/53.31 |
| 2002/0015379 | A1 * | 2/2002 | Yamaguchi et al. ...... | 369/275.3 |
| 2002/0114241 | A1 * | 8/2002 | Tosaki et al. ............. | 369/53.22 |
| 2002/0181705 | A1 | 12/2002 | Sako | |
| 2003/0012098 | A1 | 1/2003 | Sako et al. | |
| 2003/0067858 | A1 | 4/2003 | Kuroda et al. | |
| 2003/0117920 | A1 | 6/2003 | Sako et al. | |
| 2003/0198164 | A1 * | 10/2003 | Eom ....................... | 369/53.34 |
| 2003/0218950 | A1 * | 11/2003 | Yamada ................... | 369/53.21 |
| 2004/0001414 | A1 * | 1/2004 | Kadowaki et al. ........ | 369/59.24 |

FOREIGN PATENT DOCUMENTS

| | | |
|---|---|---|
| JP | 8-293157 | 11/1996 |
| JP | 2001-216650 | 8/2001 |
| JP | 2002-57977 | 2/2002 |
| JP | 2002-319245 | 10/2002 |
| JP | 2003-22539 | 1/2003 |
| JP | 2003-85896 | 3/2003 |

* cited by examiner

*Primary Examiner*—Wayne R Young
*Assistant Examiner*—Thomas D Alunkal
(74) *Attorney, Agent, or Firm*—Drinker Biddle & Reath LLP

(57) ABSTRACT

On a disc master DS, a record mark having a variable length according to the first data is formed at a displaced position to which the record mark is displaced, in a direction crossing the reading direction thereof, according to a wobble signal obtained by modulating the second data in a predetermined modulating method. A second start position at which the head of the second data is recorded is away from a first start position at which the head of the first data is recorded by a predetermined value.

7 Claims, 8 Drawing Sheets

INFORMATION RECORDING MEDIUM, AND INFORMATION REPRODUCING APPARATUS AND METHOD

BACKGROUND OF THE INVENTION

1. Field of the Invention

The present invention relates to an information recording medium, such as an optical disc, and an apparatus for and a method of reproducing information from the information recording medium.

2. Description of the Related Art

In an optical disc represented by a Compact Disc (CD) and a DVD, the long or short length of a pit is used to record main data. However, in order to record sub data including information for copy control for the prevention of illegal copying or the like, there is a request for reserving another recording area without decreasing a recording capacity by the pit.

As a method of increasing the recording capacity by other means except the method using the long or short length of the pit, there is known a technique of displacing or shifting the position of the pit in the radial direction of the optical disc. This technique is such that information is recorded by wobbling the position of the pit in the radial direction of the optical disc and by performing spread spectrum with respect to the wobble (e.g. Japanese Patent Application Laying Open NO. 2003-85896).

This technique is such as to use predetermined data as the sub data to append a synchronization signal to the predetermined data, perform spread spectrum with respect to the predetermined data by using random data to thereby generate a wobble signal, and wobble the position of a record mark according to the wobble signal. Since the wobble is spread in spectrum, it is difficult to detect the synchronization signal appended to the predetermined data. As a result, it is possible to increase the concealment of the predetermined data to some extent.

The main data has an appended synchronization signal for the main data corresponding to the synchronization signal of the predetermined data which is the sub data. The predetermined data is recorded onto the optical disc, by coinciding the start position of the predetermined data, which is indicated by the synchronization signal appended to the predetermined data, with the start position of the main data, which is indicated by the synchronization signal appended to the main data, and by wobbling the position of the record mark according to the wobble signal in the same area as an area into which the main data is recorded.

Thus, there is the possibility that the start position of the predetermined data is specified by reproducing the main data as well as the wobble signal from the optical disc and by detecting the synchronization signal appended to the predetermined data from the reproduced wobble signal on the basis of the synchronization signal appended to the reproduced main data. If the start position of the predetermined data is specified, the predetermined data is reproduced, which causes the problem that it is impossible to ensure the concealment of the information for copy control associated with copyright information or the like.

SUMMARY OF THE INVENTION

It is therefore an object of the present invention to provide an information recording medium which ensures the concealment of the recorded information for copy control, as well as an apparatus for and method of reproducing the information from the information recording medium, as one example.

The present invention will be explained hereinafter. An information recording medium of the present invention may be disc-shaped and may comprise various optical discs, such as a CD, a Compact Disc-Read Only Memory (CD-ROM), a DVD, and a DVD-ROM, for example.

The above object of the present invention can be achieved by an information recording medium on which a record mark having a variable length according to first data is formed at a displaced position to which the record mark is displaced, in a direction crossing a reading direction of the record mark, according to a wobble signal obtained by modulating second data in a predetermined modulating method, wherein a first start position at which a head of the first data is recorded is away from a second start position at which a head of the second data is recorded by a predetermined value.

According to the information recording medium of the present invention, the record mark is formed along a circular track as a pit on the information recording medium, for example. The first data is recorded according to the variable length (i.e. the long or short length) of the record mark. The track, in close-up, meanders or wobbles in the direction crossing a reading direction. The meandering or wobbling of the track is referred to as the "wobble" and has a shape corresponding to the wobble signal. The wobble signal can be obtained by modulating the second data in the predetermined modulating method. In other words, the record mark is formed at the displaced position to which it is displaced, in the direction crossing the reading direction, according to the wobble signal.

On the information recording medium, the first start position at which the head of the first data is recorded is away from the second start position at which the head of the second data is recorded only by the predetermined value. Thus, the second data reproduced from the information recording medium is started with a predetermined time delay with respect to the beginning of the first data reproduced from the information recording medium.

For example, it is assumed that the synchronization signal is appended to the first data as a clue for indicating the head of the first data and that the synchronization signal is appended to the second data as a clue for indicating the head of the second data. In such an assumption, even if the synchronization signal for indicating the beginning of the second data is tried to be detected on the basis of the synchronization signal appended to the first data, which is obtained upon reproducing the first data from the information recording medium, it is difficult to detect the synchronization signal appended to the second data because the beginning of the first data does not agree with the beginning of the second data. As described above, according to the present invention, it is possible to greatly improve the concealment of the second data. Particularly, if the information for copy control for the prevention of illegal copying or the like is adopted as the second data, it is possible to effectively forbid illegal copying.

In one aspect of the information recording medium of the present invention, the information recording medium is provided with a recording area in which the first data is recorded sequentially from the head thereof as the first start position, and the second data is recorded sequentially from the head thereof from the second start position which is away behind the first start position by the predetermined value, and an end portion of the second data corresponding to the predetermined value is recorded before the second start position in the recording area.

According to this aspect, it is possible to record the first data and the second data in the same recording area on the information recording medium.

In this aspect, it may be constructed such that the first data includes position information for indicating the predetermined value or a parameter for calculating the predetermined value.

By constructing in this manner, it is possible to change the predetermined value on the basis of the position information included in the first data. Thus, it becomes more difficult to specify the beginning of the second data. As a result, it is possible to further improve the concealment of the second data. The parameter is a variable which is inputted to a predetermined function for calculating the predetermined value. The predetermined value can be calculated by inputting the parameter to the predetermined function.

In another aspect of the information recording medium of the present invention, the predetermined modulating method is a spread spectrum modulating method.

According to this aspect, even if the wobble signal is reproduced from the information recording medium, it only looks like a noise because of the spread spectrum, so that it is possible to further improve the concealment of the second data.

The above object of the present invention can be also achieved by an information reproducing apparatus for reproducing information recorded on the above-described information recording medium (including its various aspects), the information reproducing apparatus provided with: a reading device for reading the record mark recorded on the information recording medium; a read signal generating device for generating a read signal for indicating the variable length of the record mark on the basis of an output signal from the reading device; a first data reproducing device for reproducing the first data on the basis of the read signal; a wobble signal generating device for generating the wobble signal for indicating the displaced position of the record mark on the basis of the output signal from the reading device; a second data reproducing device for reproducing the second data from the generated wobble signal; and an authenticity judging device for detecting a time difference or a data amount between a head of the reproduced first data and a head of the reproduced second data, comparing the detected time difference or the detected data amount with a time length or a data amount corresponding to the predetermined value, and judging authenticity of the information recording medium on the basis of a comparison result.

According to the information reproducing apparatus of the present invention, it reproduces the second data from the above described information recording medium of the present invention. On the information recording medium, the first data is recorded according to the variable length (i.e. the long or short length) of the record mark. The record mark is formed at the displaced position to which the record mark is displaced, in a direction crossing a reading direction of the record mark, according to the wobble signal obtained by modulating the second data in the predetermined modulating method. Moreover, in the recording area in which the first data is recorded, the second data is recorded sequentially from the head from the second start position which is away behind the first start position by the predetermined value, and the end portion of the second data corresponding to the predetermined value is recorded before the second start position.

The information reproducing apparatus is provided with: the reading device; the read signal generating device; the first data reproducing device; the wobble signal generating device; the second data reproducing device; and the authenticity judging device. The reading device reads the record mark recorded on the information recording medium. Then, the read signal generating device generates the read signal for indicating the variable length of the record mark on the basis of an output signal from the reading device. The first data reproducing device reproduces the first data on the basis of the read signal. The wobble signal generating device generates the wobble signal for indicating the displaced position of the record mark on the basis of the output signal from the reading device. Then, the second data reproducing device reproduces the second data from the generated wobble signal. In this case, the wobble signal may be demodulated by a predetermined demodulating method which makes a pair with the predetermined modulating method. Finally, the authenticity judging device detects a time difference or a data amount between a head of the reproduced first data and a head of the reproduced second data, compares the detected time difference or the detected data amount with a time length or a data amount corresponding to the predetermined value, and judges the authenticity of the information recording medium on the basis of the comparison result.

In this case, on the information recording medium, it is possible to judge or determine whether or not the interval between the first start position and the second start position is the predetermined value. The information recording medium on which the interval between the first start position and the second start position is the predetermined value can be judged to be "true", and the information recording medium on which the interval between the first start position and the second start position is not the predetermined value can be judged to be "false". The predetermined value may be a time length or a data amount.

In one aspect of the information reproducing apparatus of the present invention, the information reproducing apparatus is further provided with a data reproduction restricting device for restricting reproduction of the first data by the first data reproducing device and reproduction of the second data by the second data reproducing device if said information recording medium is judged to be false by the authenticity judging device.

According to this aspect, it is possible to effectively forbid the reproduction of the information recording medium judged to be "false", by stopping the reproduction of the first data and the second data in order to restrict the reproduction of the first data and the second data.

In another aspect of the information reproducing apparatus of the present invention, the information recording medium has a recording area in which the first data is recorded sequentially from the head thereof as the first start position, and the second data is recorded sequentially from the head thereof from the second start position which is away behind the first start position by the predetermined value, and an end portion of the second data corresponding to the predetermined value is recorded before the second start position in the recording area, and the information reproducing apparatus is further provided with a second data rearranging device for rearranging an order of the reproduced second data on the basis of the predetermined value so as to return the end portion of the second data, which is replaced and recorded before the second start position, to an original position.

According to this aspect, it is possible to rearrange and reproduce the order or the second data to an original order by returning the end portion of the second data replaced and recorded before the second start position upon recording to the original position.

The above object of the present invention can be also achieved by an information reproducing method of reproducing information recorded on the above-described information recording medium (including its various aspects), the information reproducing method provided with: a reading process of reading the record mark recorded on the information recording medium; a read signal generating process of generating a read signal for indicating the variable length of the record mark on the basis of an output signal in the reading process; a first data reproducing process of reproducing the first data on the basis of the read signal; a wobble signal generating process of generating the wobble signal for indicating the displaced position of the record mark on the basis of the output signal in the reading process; a second data reproducing process of reproducing the second data from the generated wobble signal; and an authenticity judging process of detecting a time difference or a data amount between a head of the reproduced first data and a head of the reproduced second data, comparing the detected time difference or the detected data amount with a time length or a data amount corresponding to the predetermined value, and judging authenticity of the information recording medium on the basis of a comparison result.

According to the information reproducing method, in the same manner as the above described information reproducing apparatus of the present invention, it is possible to judge or determine whether or not the interval between the first start position and the second start position is the predetermined value, so that the information recording medium can be judged to be "true" or "false".

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENTS

The preferred embodiments of the present invention will be explained with reference to the drawings hereinafter.

1. First Embodiment

<1-1. Basic Structure of Optical Disc>

Figure 1:
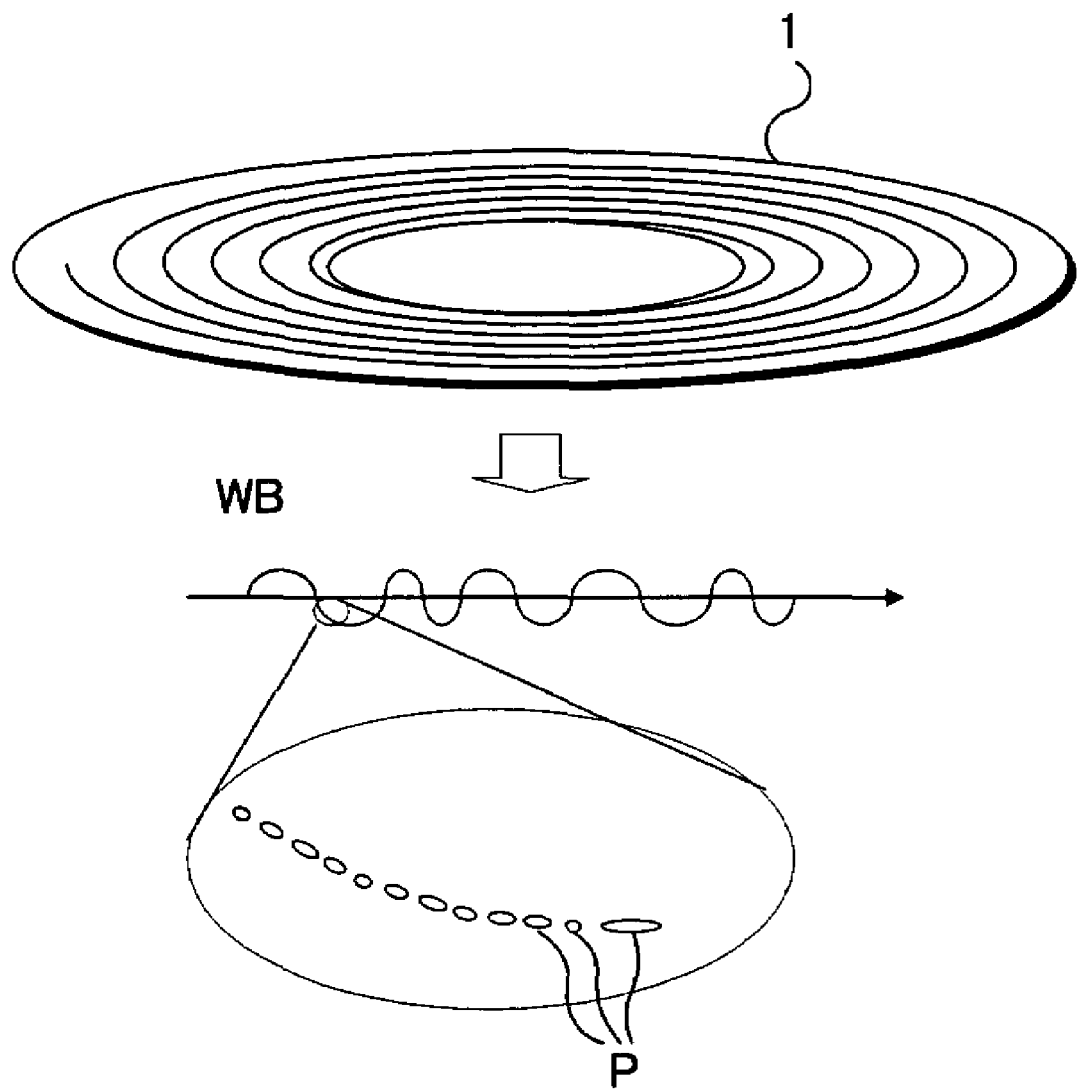
FIG. 1 is an explanatory diagram showing tracks formed on a master disc DS.

In the first embodiment, a DVD is taken and explained as one example of the information recording medium, but it is to be understood that the present invention is not limited to the first embodiment. FIG. 1 shows tracks formed on an optical disc 1. On the optical disc 1, record marks are formed along circular tracks as pits P. Pit data DP is recorded according to the variable length (i.e. the long or short length) of the record mark. The track, in close-up, meanders or wobbles in the direction crossing a reading direction. The meandering or wobbling of the track is referred to as the "wobble" and has a shape corresponding to a wobble signal WB. The wobble signal WB is generated on the basis of wobble data DW. Namely, in addition to the pit data DP, the wobble data DW is superposedly or redundantly recorded by the meandering or wobbling of the record mark on the optical disc 1. The pit data DP has image and audio information or the like, and the wobble data DW has management information about copyright, such as copy information.

As described later, an error-correcting code ECCp and a pit synchronization signal SYNCp are appended to the pit data DP, to thereby generate record pit data DPa. In the meantime, an error-correcting code ECCw and a wobble synchronization signal SYNCw are appended to the wobble data DW, to thereby generate record pit data DWa. The length of the record mark is determined from the record pit data DPa, and the shape of the wobble is determined from the record wobble data DWa.

Figure 2:
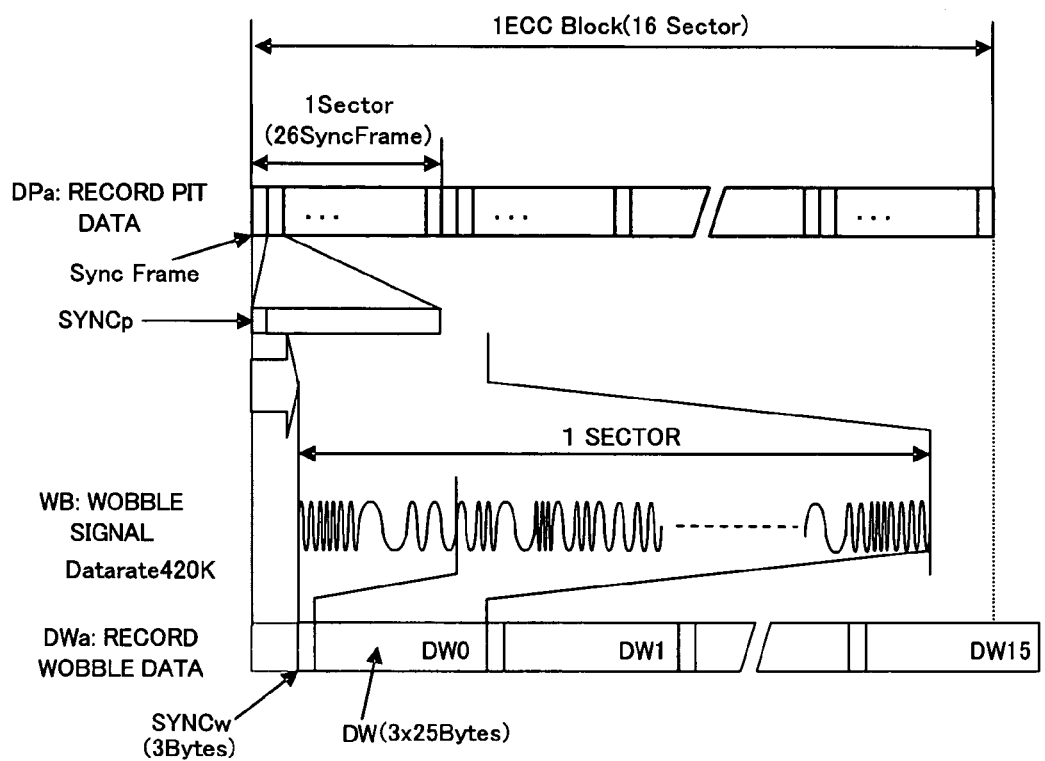
FIG. 2 is an explanatory diagram showing the data formats of record pit data DPa and record wobble data DWa associated with a first embodiment of the present invention.

FIG. 2 shows the data formats of the record pit data DPa and the record wobble data DWa. In the first embodiment, the data unit of the pit data DP to which the error-correcting code ECCp is appended is referred to as an ECC block. As shown in FIG. 2, one ECC block includes 16 sectors, and one sector includes 26 synchronization frames. The pit synchronization signal SYNCp is placed at the head of the synchronization frame.

While one sector of the record pit data DPa is recorded, one sector of the record wobble data DWa is recorded. At the head of the one sector of the record wobble data DWa, 3 bytes of the wobble synchronization signal SYNCw is placed. Following this, 3×25 bytes of the wobble data DW is placed.

In the record pit data DPa, the pit synchronization signal SYNCp indicates the beginning of the pit data DP. In the record wobble data DW, the wobble synchronization signal SYNCw indicates the beginning of the wobble data DW. The first embodiment is constructed such that the wobble synchronization signal SYNCw is recorded with a predetermined time delay with respect to the pit synchronization signal SYNCp. Namely, the head of the pit data DP and the head of the wobble data DW do not start from the same position on the optical disc 1, but they are out of alignment only by a predetermined distance. For the following reasons, the pit data DP and the wobble data DW are recorded at the predetermined interval and are out of phase, as described above.

The wobble data DW has the copyright management information. Therefore, this makes it possible to judge or determine whether the optical disc 1 is an authentic product copied under the proper management of copyright. The wobble data DW is required to be managed under high security. However, if the beginning of the pit data DP and the beginning of the wobble data DW are coincided, the beginning of the wobble data is specified easily by detecting the pit synchronization signal SYNCp. Thus, in the first embodiment, recording the pit data DP and the wobble data DW at the predetermined interval makes it difficult to specify the beginning of the wobble data DW, thereby to improve the concealment of the wobble data DW.

<1-2. Entire Structure of Mastering Apparatus>

Figure 3:
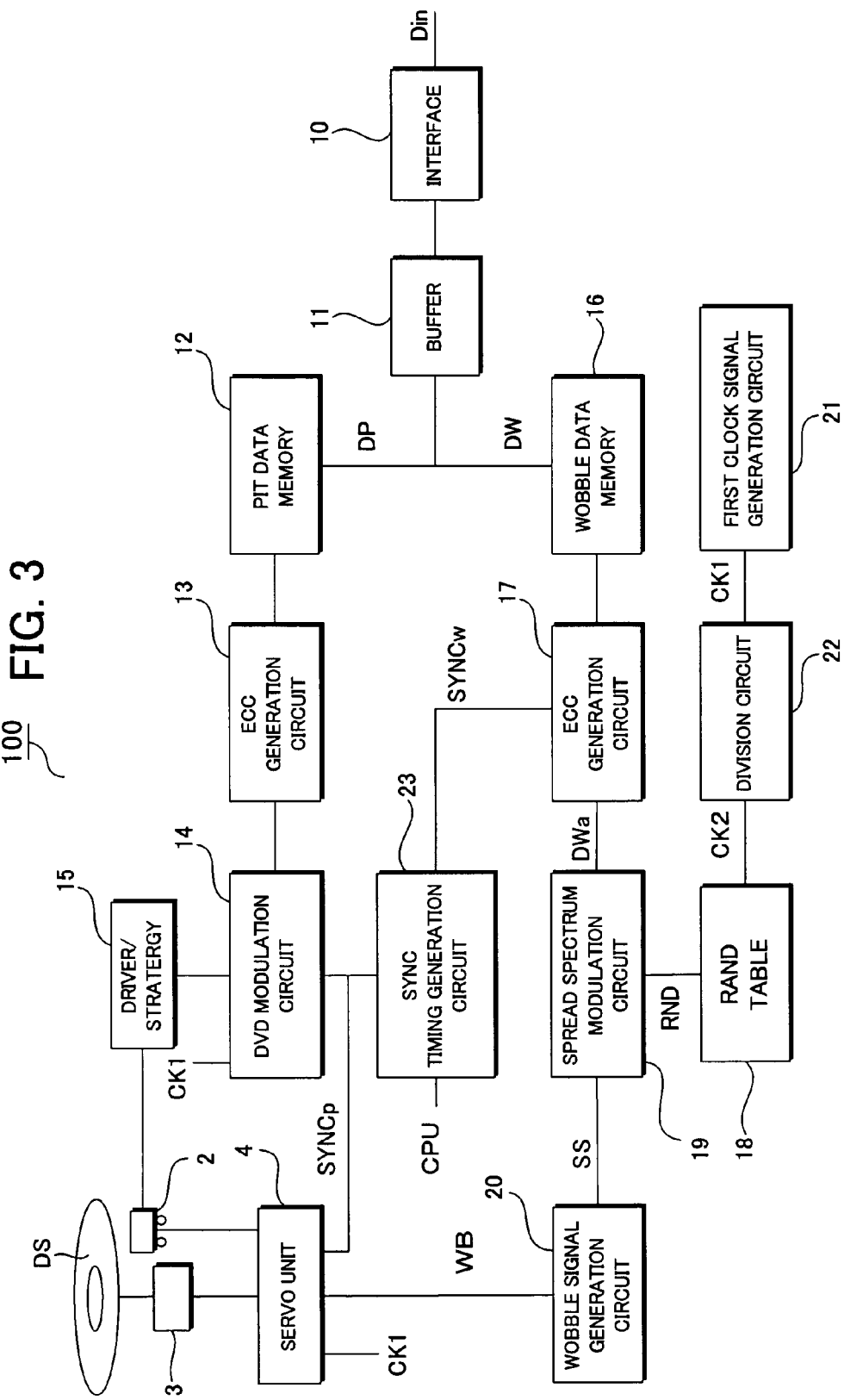
FIG. 3 is a block diagram showing the entire structure of a mastering apparatus associated with the first embodiment of the present invention.

FIG. 3 shows the entire structure of a mastering apparatus. A mastering apparatus 100 is intended to make a master disc DS for the optical disc and is provided with: a recording unit 2; a spindle motor 3 for rotating the master disc DS; and a servo unit 4. The master disc DS is made as a glass master on which photoresist is applied, for example. The recording unit 2 is provided with: a laser diode for irradiating laser light; an optical system for focusing the laser light on the master disc DS; and a slider apparatus for moving the laser diode and the optical system as one body in the radial direction of the master disc DS. The laser diode emits the laser light with a power corresponding to a driving signal supplied from a driver 15. The slider apparatus moves the optical system and the laser diode in the radial direction of the master disc DS according to a control signal from the servo unit 4.

A first clock signal CK1 and the pit synchronization signal SYNCp are supplied to the servo unit 4. In synchronization with these signals, the servo unit 4 performs spindle servo for controlling the rotation of the spindle motor 3, focus servo for controlling the focus of the laser light, and slide servo for controlling the slider apparatus. In the slide servo out of them, the control signal is generated by adding a wobble signal WB to a signal for forming a spiral track, and the slider apparatus is controlled by the control signal.

The first clock signal CK1 is generated by a first clock signal generation circuit 21. In the first embodiment, the frequency of the first clock signal CK1 is 10.5 MHz. The first clock signal CK1 is a time reference for the pit data DP. A division circuit 22 frequency-divides the first clock signal CK1 and generates a second clock signal CK2 or the like. The frequency of the second clock signal CK2 is 420 KHz. The second clock signal CK2 is used for the generation of the wobble signal WB and is a time reference for it.

The input data Din is supplied from external equipment to the mastering apparatus 100. The input data Din is taken into a buffer 11 through an interface 10. The input data Din taken into the buffer 11 is divided into the pit data DP and the wobble data DW under the control of a Central Processing Unit (CPU), and they are transferred to a pit data memory 12 and a wobble data memory 16, respectively.

The CPU reads the pit data DP from the pit data memory 12 and supplies it to an Error-Correcting Code (ECC) generation circuit 13. After scrambling in which the data order of the pit data DP is rearranged according to a preset rule, the ECC generation circuit 13 generates an error-correcting code ECCp and appends it to the pit data DP. A DVD modulation circuit 14 generates the pit data DP by modulating the output data of the ECC generation circuit 13. The pit synchronization signal SYNCp generated on a SYNC timing generation circuit 23 is appended to the pit data DP. The pit data DP obtained in this manner is referred to as the "record pit data DPa" in the explanation below.

In the meantime, the wobble data DW stored in the wobble data memory 16 is read from there and supplied to an ECC generation circuit 17 under the control of the CPU. After scrambling in which the data order of the wobble data DW is rearranged, the ECC generation circuit 17 appends the error-correcting code ECCw generated on the basis of the wobble data DW and the wobble synchronization signal SYNCw generated on the SYNC timing generation circuit 23 to the rearranged wobble data DW, to thereby generate the record wobble data DWa, under the control of the CPU.

On the master disc DS, the CPU performs control with respect to the operation of the SYNC timing generation circuit 23 so that the wobble data DW is recorded at the predetermined interval with respect to the pit data DP. The CPU determines a time relationship between the pit synchronization signal SYNCp and the wobble synchronization signal SYNCw so that the wobble synchronization signal SYNCw is delayed by a predetermined time length with the start position in time of the pit synchronization signal SYNCp as a reference. The SYNC timing generation circuit 23 generates the pit synchronization signal SYNCp and the wobble synchronization signal SYNCw on the basis of the time relationship between the pit synchronization signal SYNCp and the wobble synchronization signal SYNCw which is determined by the CPU. The ECC generation circuit 17 appends the wobble synchronization signal SYNCw on the basis of a timing at which the SYNC timing generation circuit 23 generates the wobble synchronization signal SYNCw, to thereby generate the record wobble data DWa. Incidentally, the DVD modulation circuit 14 appends the pit synchronization signal SYNCp on the basis of a timing at which the SYNC timing generation circuit 23 generates the pit synchronization signal SYNCp, to thereby generate the record pit data DWp.

A random pattern used for spread spectrum is stored on a RAND table 18. The random pattern corresponds to a spread code and is a bit row generated by using a random function. The second clock signal CK2 is supplied to the RAND table 18. The random pattern is read in synchronization with the second clock signal CK2. The read random pattern is supplied to a spread spectrum modulation circuit 19 as random data RND. The spread spectrum modulation circuit 19 multiplies the record wobble data DWa with the random data RND, to thereby generate the spread spectrum data SS. The spread spectrum modulation circuit 19 can be constructed from an exclusive OR (XOR) circuit, for example.

A wobble signal generation circuit 20 generates the wobble signal WB by band-limiting the spread spectrum data SS. In this case, the wobble signal generation circuit 20 can be constructed from a band pass filter, a low pass filter, or the like, for example.

The master disc DS on which the record mark is formed by the mastering apparatus 100 is developed to be a resist master. After that, one metal master is made through an electroforming process of plating on the basis of the resist master, and then a plurality of mothers are made from the one metal master. Furthermore, a plurality of stampers are made from the plurality of mothers. The optical disc 1 is produced by pressing resin, such as plastic, by using the stamper.

<1-3. Information Reproducing Apparatus>

Figure 4:
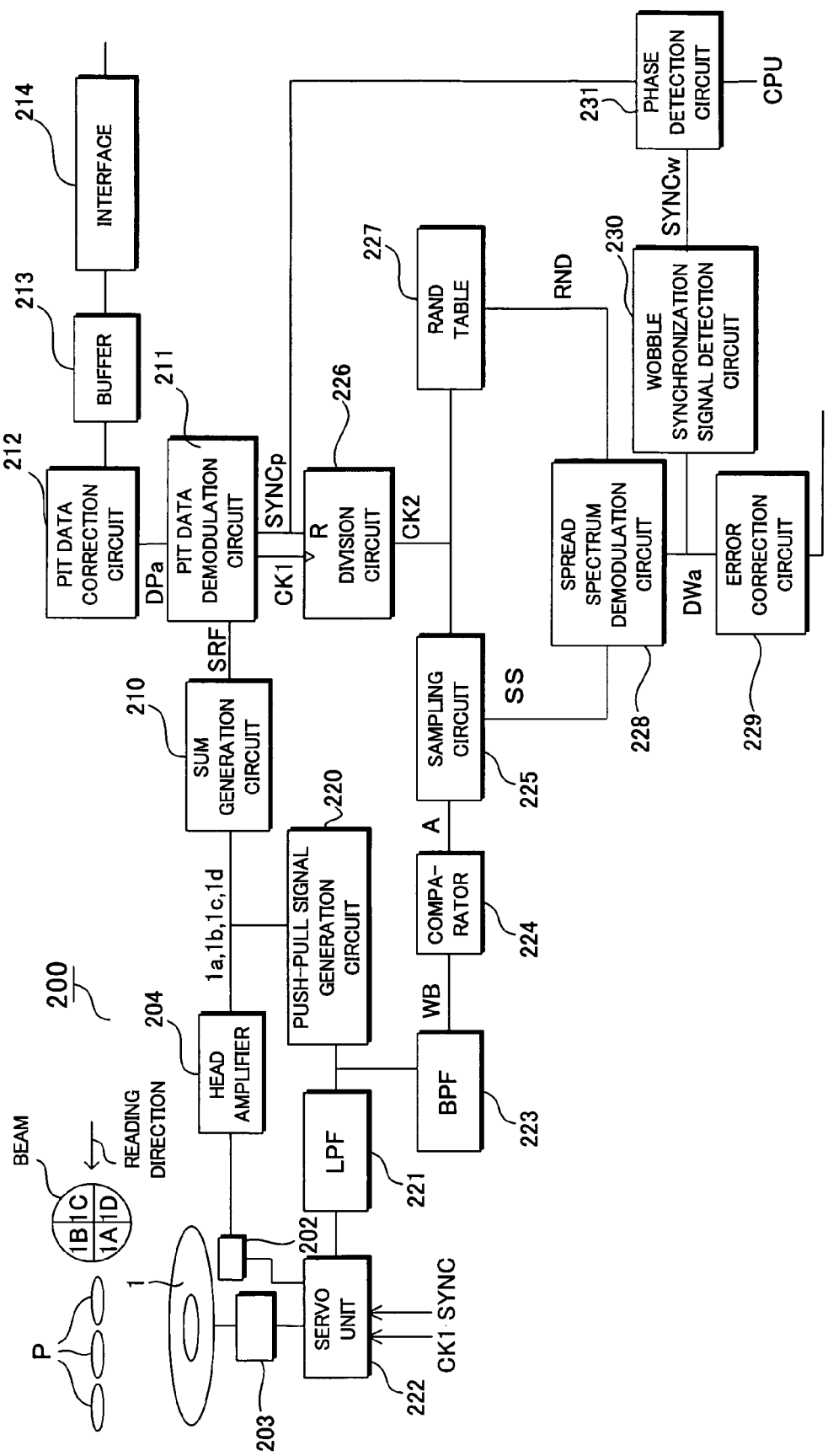
FIG. 4 is a block diagram showing the entire structure of an information reproducing apparatus associated with the first embodiment of the present invention.

Next, the information reproducing apparatus will be explained. FIG. 4 shows the entire structure of an information reproducing apparatus 200.

The information reproducing apparatus 200 is provided with: an optical pickup 202 for irradiating a reproduction beam onto the optical disc 1, which is the information recording medium, and for outputting a signal corresponding to reflected light; a spindle motor 203 for controlling the rotation of the optical disc 1; and a servo unit 222. The first clock signal CK1 and the pit synchronization signal SYNCp are supplied to the servo unit 222. In synchronization with these signals, the servo unit 222 performs spindle servo for controlling the rotation of the spindle motor 203 and focus servo and tracking servo for controlling the relative position of the optical pickup 202 with respect to the optical disc 1.

The optical pickup 202 is provided with: a laser diode for irradiating the reproduction beam; and a four-division detection circuit (not-illustrated). The four-division detection circuit divides by 4 the reflected light of the reproduction beam into areas 1A, 1B, 1C, and 1D shown in FIG. 4, and outputs each signal corresponding to the quantity of light in respective one of the areas. A head amplifier 204 amplifies each output signal of the optical pickup 202, and outputs a divisional read signal 1a corresponding to the area 1A, a divisional read signal 1b corresponding to the area 1B, a divisional read signal 1c corresponding to the area 1C, and a divisional read signal 1d corresponding to the area 1D. Incidentally, the optical pickup 202 and the head amplifier 204 correspond to the "reading device" described above.

A sum generation circuit 210 corresponds to the "read signal generating device" and is constructed from an addition circuit for adding the divisional read signals 1a, 1b, 1c, and 1d and for outputting a sum read signal SRF. Incidentally, the sum read signal SRF represents the length of the record mark and corresponds to the above-described "read signal".

Figure 5:
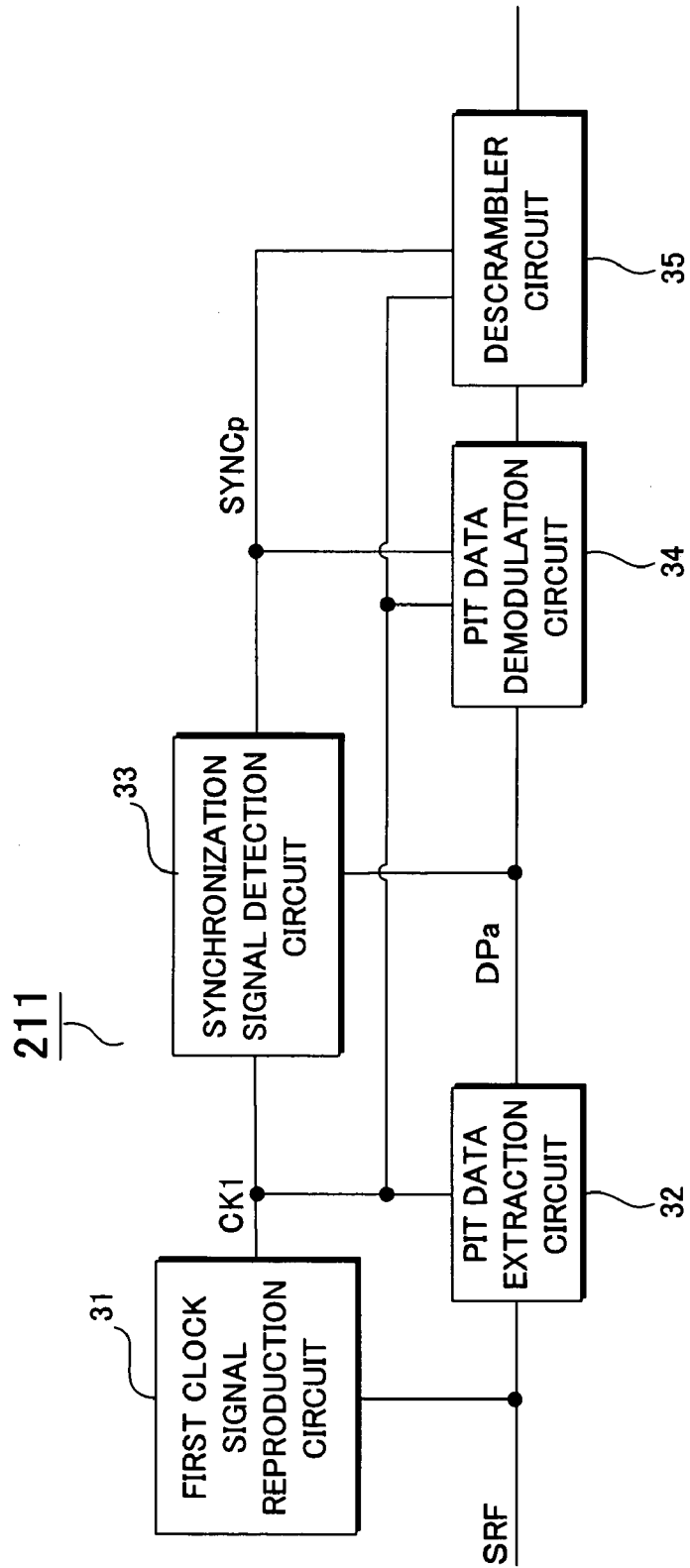
FIG. 5 is a block diagram showing the structure of a pit data demodulation circuit of the information reproducing apparatus.

A pit data demodulation circuit 211 reproduces the record pit data DPa and generates the first clock signal CK1 on the basis of the sum read signal SRF. The pit data demodulation circuit 211 corresponds to the above-described "first data reproducing device". FIG. 5 shows the structure of the pit data demodulation circuit 211. As shown in FIG. 5, the pit data demodulation circuit 211 is provided with: a first clock signal reproduction circuit 31; a pit data extraction circuit 32; a synchronization signal detection circuit 33; a pit data demodulation circuit 34; and a descrambler circuit 35.

The first clock signal reproduction circuit 31 reproduces the first clock signal CK1 synchronized with the record pit data DPa on the basis of the sum read signal SRF. The pit data extraction circuit 32 samples, with the first clock signal CK1, a binary signal obtained by binarizing the sum read signal SRF and reproduces the record pit data DPa.

The synchronization signal detection circuit 33 detects a synchronization pattern included in the reproduced record pit data DPa and generates the pit synchronization signal SYNCp. The synchronization pattern is a particular data pattern which is not included in other pit data, and has a constant cycle. The pit synchronization signal SYNCp indicates the timing of the synchronization pattern.

The pit data demodulation circuit 34 generates reproduction data by demodulating the reproduced record pit data DPa with a predetermined table, with the pit synchronization signal SYNC being as a reference position. For example, if Eight to Fourteen Modulation (EFM) is used as a modulating method, the demodulation processing is performed in which 14 bits of the record pit data DPa is converted into 8 bits of the reproduction data. The descrambler circuit 35 performs descrambling in which the order of the reproduction data is rearranged according to a preset rule, and outputs the processed reproduction data.

The reproduction data obtained in this manner is supplied to a pit data error correction circuit 212 shown in FIG. 4, and after error correcting and interpolating therein, it is stored into a buffer 213. An interface 214 sequentially reads the data stored in the buffer 213, converts it into a predetermined output form, and outputs it to external equipment.

Back in FIG. 4, the explanation goes on. A push-pull signal generation circuit 220 calculates (1a+1d)−(1b+1c) and generates a push-pull signal. The component (1a+1d) corresponds to the areas 1A and 1D which are on the left side with respect to the reading direction, while the component (1b+1c) corresponds to the areas 1B and 1C which are on the right side with respect to the reading direction. Namely, if the reproduction beam inclines to the left side with respect to the pit, the push-pull signal will have positive polarity with the amplitude center thereof as a standard. If the reproduction beam is positioned in the center of the pit, the value of the push-pull signal will be in the amplitude center thereof. If the reproduction beam inclines to the right side with respect to the pit, the push-pull signal will have negative polarity with the amplitude center thereof as a standard. The relative position between the reproduction beam and the pit changes according to the meandering or wobbling of the track, and the value of the push-pull signal represents the relative position between the reproduction beam and the pit. Namely, the push-pull signal is a signal corresponding to the meandering or wobbling of the track.

The push-pull signal is outputted through a low pass filter 221 to the servo unit 222. The servo unit 222 performs tracking control on the basis of the push-pull signal. Moreover, the push-pull signal is supplied to a band pass filter 223. The pass band of the band pass filter 223 is set to extract the wobble signal WB obtained by the spread spectrum modulation of the wobble data DW upon recording from the push-pull signal. Therefore, the band pass filter 223 constitutes the "wobble signal generating device" described above with the push-pull signal generation circuit 220, and the output signal of the band pass filter 223 is such as to reproduce the wobble signal WB from the optical disc 1.

Figure 6:
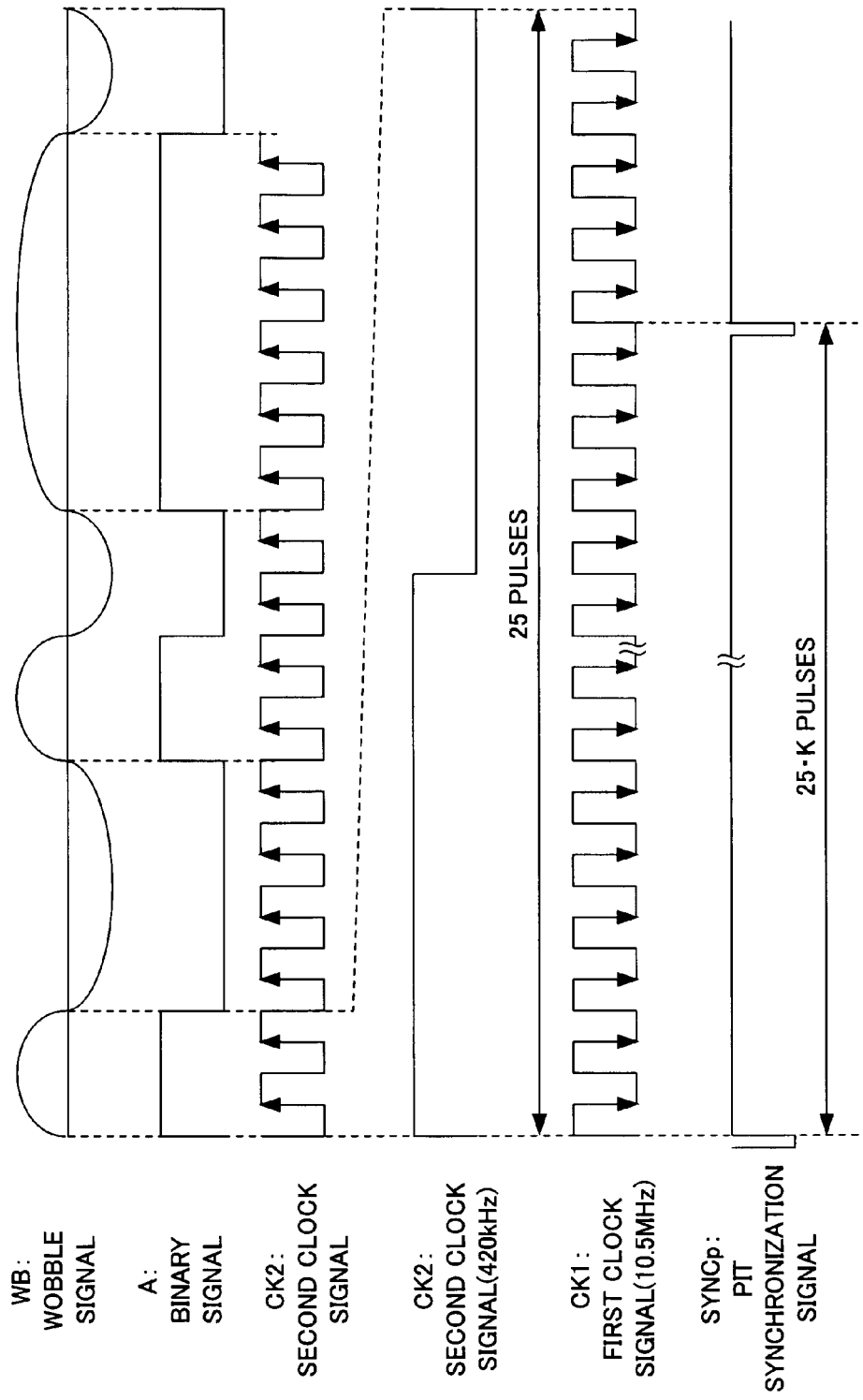
FIG. 6 is a timing chart of a wobble signal WB, a binary signal A, a first clock signal CK1, a second clock signal CK2, and a pit synchronization signal SYNCp.

FIG. 6 shows a timing chart of the wobble signal WB, a binary signal A, the first clock signal CK1, the second clock signal CK2, and the pit synchronization signal SYNCp. A comparator 224 outputs the binary signal A obtained by binarizing the wobble signal WB. Since the wobble signal WB has a low frequency, the inclination thereof near zero crossing is relatively mild. Thus, the binary signal A has a large jitter component. A sampling circuit 225 samples the binary signal A by using the second clock signal CK2 and extracts the data, to thereby reproduce the spread spectrum data SS.

In the first embodiment, the frequency f1 of the first clock signal CK1 is 10.5 MHz and the frequency f2 of the second clock signal CK2 is 420 KHz. Thus, a division circuit 226 generates the second clock signal CK2 by frequency-dividing the first clock signal CK1 by 25. Therefore, as shown in FIG. 6, one cycle of the second clock signal CK2 can contain therein 25 first clock signals CK1. The division circuit 226 is set to be reset if the voltage of a reset terminal R is active (at a low level), and the pit synchronization signal SYNCp is supplied to the reset terminal R. Therefore, the second clock signal CK2 is reset by the trailing of the pit synchronization signal SYNCp, and its phase is determined from the pit synchronization signal SYNCp.

The synchronization patterns are inserted in the record pit data DPa with a cycle of 25×K (K: natural number) bits, and each has such a relationship that the beginning of the synchronization pattern agrees with the leading or rising edge of the second clock signal CK2. Namely, the synchronization pattern has a frequency which is a natural multiple of that of the second clock signal CK2. In this case, if the pit synchronization signal SYNC becomes active at the timing shown in FIG. 6, the division circuit 226 is reset and the phases of the pit synchronization signal SYNCp and the second clock signal CK2 are adjusted. This makes it possible to adjust the occurrence timing of the leading edge of the second clock signal CK2 by using the first clock signal CK1 with a higher frequency. Therefore, even if the edge of the binary signal A is influenced and wobbled by jitter, it is possible to certainly extract the spread spectrum data SS.

Back in FIG. 4, the explanation goes on. A random pattern used for the spread spectrum modulation upon recording is stored on a RAND table 227. The random pattern corresponds to a spread code and is a bit row generated by using a random function. The second clock signal CK2 is supplied to the RAND table 227. By reading the random pattern in synchronization with the second clock signal CK2, the random data RND is generated. The generated random data RND is supplied to a spread spectrum demodulation circuit 228. Moreover, the spread spectrum data SS outputted from the sampling circuit 225 is supplied to the spread spectrum demodulation circuit 228. The spread spectrum data SS is multiplied with the random data RND, thereby to reproduce the record wobble data DWa. In this case, a signal which is not in an original signal band is converted into a signal which is out of the band by the multiplication. Incidentally, the comparator 224, the sampling circuit 225, the division circuit 226, the RAND table 227, and the spread spectrum demodulation circuit 228 constitute the above-described "second data reproducing device".

A wobble synchronization signal detection circuit 230 detects the wobble synchronization signal SYNCw from the reproduced record wobble data DWa and sequentially outputs the detected wobble synchronization signal SYNCw.

The pit synchronization signal SYNCp is sequentially supplied to a phase detection circuit 231 from the pit data demodulation circuit 211. The phase detection circuit 231 detects a time relationship between the reproduced pit data DP and the reproduced wobble data DW on the basis of the pit synchronization signal SYNCp sequentially supplied and the wobble synchronization signal SYNCw sequentially outputted from the wobble synchronization signal detection circuit 230.

A time relationship between the reproduced pit data DP and the reproduced wobble data DW upon recording is set in advance on the CPU. The CPU compares the time relationship between the reproduced pit data DP and the reproduced wobble data DW which is detected by the phase detection circuit 231 with time relationship between the reproduced pit data DP and the reproduced wobble data DW upon recording. The CPU judges to be "true" if the both agree and to be "false" if the both do not agree. The time relationship includes a concept of a data amount. For example, the byte number between the head of the pit data DP and the head of the wobble data DW upon recording is stored as a predetermined value. It is possible to judge the authenticity by a comparison with the predetermined value upon reproducing. The CPU allows the reproduction of the optical disc 1 if judging to be "true". In this case, the record wobble data DWa is supplied to an error correction circuit 229 and outputted after the error correction. On the other hand, if judging to be "false", the CPU stops the reproduction of the optical disc 1 and controls a loading mechanism to eject the optical disc 1 from the apparatus. This makes it possible to effectively forbid the reproduction of the illegally copied optical disc 1.

Incidentally, the wobble synchronization signal detection circuit 230, the phase detection circuit 231, and the CPU corresponds to the above-described "authenticity judging device". Moreover, the CPU also corresponds to the above-described data reproduction restricting device.

2. Second Embodiment

<2-1: Basic Structure of Optical Disc>

In the second embodiment, as with the structure of the optical disc 1 shown in FIG. 1, the pit data DP is recorded according to the length of the record mark on the optical disc 1. On the other hand, in addition to the pit data DP, the wobble signal WB is superposedly or redundantly recorded by the meandering or wobbling of the record mark on the optical disc 1.

Moreover, as explained with reference to FIG. 1, the length of the record mark is determined from the record pit data DPa, and the shape of the wobble is determined from the record wobble data DWa. Incidentally, the pit data DP has image and audio information or the like, and the wobble data DW has the management information about copyright, such as copy information.

Figure 7:
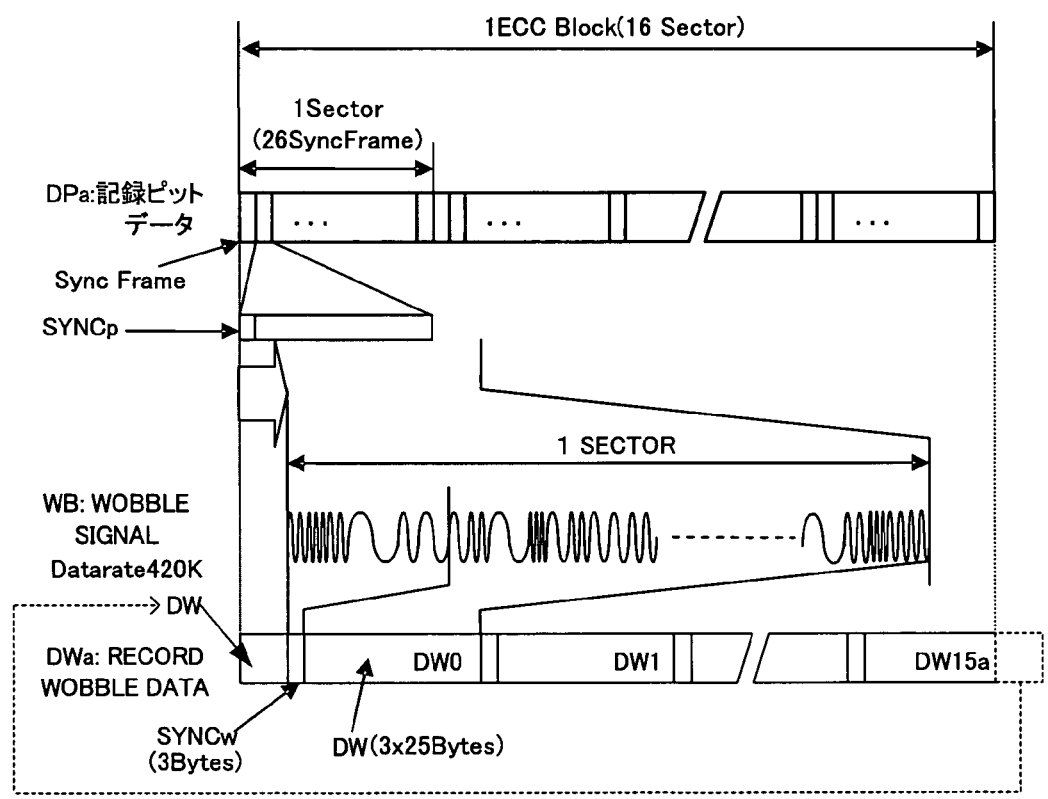
FIG. 7 is an explanatory diagram showing the data formats of record pit data DPa and record wobble data DWa associated with a second embodiment of the present invention.

FIG. 7 shows the data formats of the record pit data DPa and the record wobble data DWa. In the second embodiment, the structure of the record pit data DPa is the same as that of record pit data DPa shown in FIG. 2, and the detailed structure of the record wobble data DWa is different from that of the record wobble data DWa shown in FIG. 2.

In the first embodiment, as explained with reference to FIG. 2, the head of the pit data DP and the head of the wobble data DW do not start from the same position on the optical disc 1, but they are out of alignment only by the predetermined distance. Thus, the end position of the record wobble data DWa is away from the end position of the record pit data DPa only by the predetermined distance. In the second embodiment, as shown in FIG. 7, the record wobble data DWa and the record pit data DPa are recorded in the same area by placing, at the head of the record wobble data DWa, one portion of the record wobble data DWa recorded within the predetermined distance between a position of the record wobble data DWa corresponding to the end position of the record pit data DPa and the end position of the record wobble data DWa on the optical disc 1.

Namely, in the second embodiment, the real head position of the pit data DP and the real head position of the wobble data DW are out of alignment only by the predetermined distance on the optical disc 1, as in the first embodiment. However, the apparent head position of the wobble data DW is at the same position with respect to the real head position of the pit data DP, and the apparent end position of the wobble data DW is also at the same position with respect to the real end position of the pit data DP. Thus, even in the second embodiment, the pit data DP and the wobble data DW are recorded at the predetermined interval, as in the first embodiment, which makes it difficult to specify the beginning of the wobble data DW, thereby to improve the concealment of the wobble data DW.

<2-2. Entire Structure of Mastering Apparatus>

A mastering apparatus in the second embodiment has the same structure of the mastering apparatus 100 in the first embodiment shown in FIG. 3. Thus, only a difference from the first embodiment will be explained with reference to FIG. 3 with regard to the mastering apparatus in the second embodiment.

As in the first embodiment, the ECC generation circuit 17 appends the wobble synchronization signal SYNCw on the basis of the timing at which the SYNC timing generation circuit 23 generates the wobble synchronization signal SYNCw. Moreover, the ECC generation circuit 17 generates the record wobble data DWa by placing, at the head of the wobble data DW, one portion of the wobble data DW which is between a position in time of the wobble data DW corresponding to the end position in time of the pit data DP and the end position in time of the wobble data DW, on the basis of the time relationship between the pit synchronization signal SYNCp and the wobble synchronization signal SYNCw which is determined by the CPU.

<2-3. Information Reproducing Apparatus>

An information reproducing apparatus in the second embodiment has the same structure as that of the information reproducing apparatus 200 in the first embodiment shown in FIG. 4. Thus, only a difference from the first embodiment will be explained with reference to FIG. 4 with regard to the information reproducing apparatus in the second embodiment.

The error correction circuit 229 is provided with a memory which is not illustrated in FIG. 4. The record wobble data DWa supplied to the error correction circuit 229 is stored in the memory. The error correction circuit 229 rearranges and reproduces the order of the record wobble data DWa by returning the one portion of the wobble data DW, which is placed at the head of the wobble data DW upon recording, to the original position of the wobble data DW, i.e. between the position of the wobble data DW corresponding to the end position of the pit data DP and the end position of the wobble data DW, on the basis of the time relationship between the pit data DP and the wobble data DW upon recording which is set by the CPU. Incidentally, in the second embodiment, the error correction circuit 229 corresponds to the above-described "second data rearranging device".

3. Third Embodiment

<3-1: Basic Structure of Optical Disc>

In the third embodiment, as in the second embodiment, the pit data DP is recorded according to the length of the record mark on the optical disc 1. On the other hand, in addition to the pit data DP, the wobble signal WB is superposedly or redundantly recorded by the meandering or wobbling of the record mark on the optical disc 1. Moreover, the length of the record mark is determined from the record pit data DPa, and the shape of the wobble is determined from the record wobble data DWa.

Figure 8:
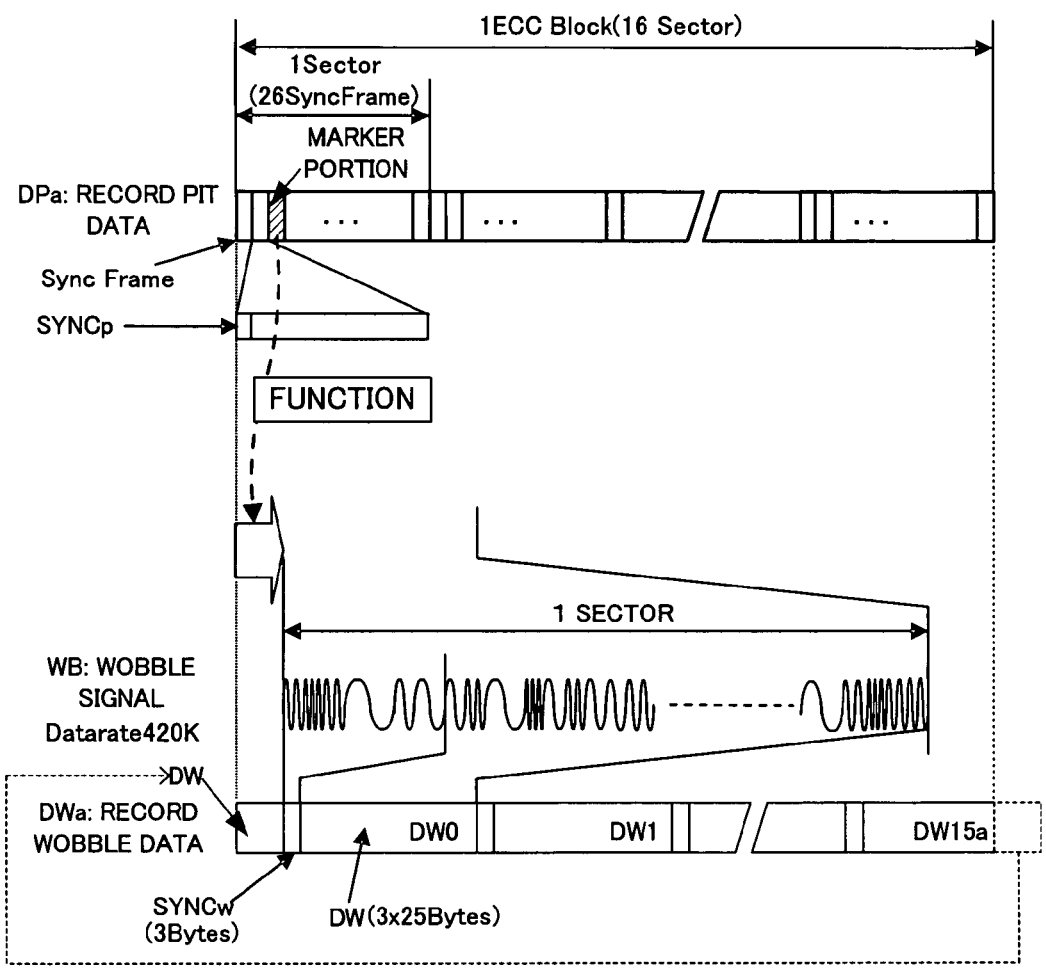
FIG. 8 is an explanatory diagram showing the data formats of record pit data DPa and record wobble data DWa associated with a third embodiment of the present invention.

FIG. 8 shows the data formats of the record pit data DPa and the record wobble data DWa. The main part of the data formats of the record pit data DPa and the record wobble data DWa in the third embodiment is substantially the same as that of the data formats of the record pit data DPa and the record wobble data DWa in the second embodiment shown in FIG. 7.

In the third embodiment, one synchronization frame included in the record pit data DPa is constructed as a marker portion. The marker portion includes an address value for indicating an address of each track or the like. The time relationship between the pit data DP and the wobble data DW, which indicates a deviation amount of the head position of the wobble data DW with respect to the head position of the pit data DP on the optical disc 1, is defined by using the address value of the marker portion in the record pit data DPa. Specifically, an output value obtained by inputting the address value to a predetermined function is used as the deviation amount. In this case, the address value corresponds to the above-described parameter.

The address value indicates the position of the track on the optical disc 1, so that it varies depending on the record position of the pit data DP. Therefore, according to the third embodiment, it is possible to change the time relationship between the pit data DP and the wobble data DW on the basis of the address value.

In the third embodiment, the pit data DP and the wobble data DW are recorded by changing the time relationship between the both, so that it is more difficult to specify the beginning of the wobble data DW. As a result, it is possible to further improve the concealment of the wobble data DW.

<3-2. Entire Structure of Mastering Apparatus>

A mastering apparatus in the third embodiment has the same structure of the mastering apparatus 100 in the second embodiment shown in FIG. 3. Thus, only a difference from the second embodiment will be explained with reference to FIG. 3, as in the second embodiment, with regard to the mastering apparatus in the third embodiment.

The CPU determines the time relationship between the pit data DP and the wobble data DW by using the address value of the marker portion in the pit data DP and the predetermined function. As in the second embodiment, the SYNC timing generation circuit 23 generates the pit synchronization signal SYNCp and the wobble synchronization signal SYNCw on the basis of the time relationship between the pit synchronization signal SYNCp and the wobble synchronization signal SYNCw which is determined by the CPU.

<3-3. Information Reproducing Apparatus>

Next, the information reproducing apparatus will be explained. An information reproducing apparatus in the third embodiment has the same structure as that of the information reproducing apparatus 200 in the second embodiment. Thus, only a difference from the second embodiment will be explained with reference to FIG. 4, as in the second embodiment, with regard to the information reproducing apparatus in the third embodiment.

In the third embodiment, the address value of the marker portion in the record pit data DPa is outputted from the pit data error correction circuit 212. The CPU may obtain the time relationship between the pit data DP and the wobble data DW upon recording by the predetermined function used upon recording by using the reproduced address value. As in the second embodiment, the record wobble data DWa is reproduced by that the error correction circuit 229 rearranges the order of the record wobble data DWa.

Incidentally, in the above-explained third embodiment, the pit data DP may include position information for indicating the deviation amount of the head position of the wobble data DW with respect to the head position of the pit data DP on the optical disc 1. In this case, on the mastering apparatus, the CPU controls the operation of the SYNC timing generation circuit 23 on the basis of the position information included in the pit data DP, upon recording the wobble data DW. Moreover, on the information reproducing apparatus, the CPU controls the operation of the error correction circuit 229 on the basis of the time relationship between the pit data DP and the wobble data DW included in the reproduced pit data DP, upon reproducing the wobble data DW.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2003-190175 filed on Jul. 2, 2003 including the specification, claims, drawings and summary is incorporated herein by reference in its entirety.

What is claimed is:

1. An information recording medium on which a record mark having a variable length according to first data is formed at a displaced position to which the record mark is displaced, in a direction crossing a reading direction of the record mark, according to a wobble signal obtained by modulating second data in a predetermined modulating method, wherein a first start position at which a head of the first data is recorded is away in the reading direction of the record mark from a second start position at which a head of the second data is recorded by a predetermined constant value, the first start position is a start position of an error correction unit of the first data, the second start position is a start position of an error correction unit of the second data, a first synchronization signal for the first data is recorded at the first start position, and a second synchronization signal for the second data is recorded at the second start position.

2. The information recording medium according to claim 1, wherein said information recording medium comprises a recording area in which the first data is recorded sequentially from the head thereof as the first start position, and the second data is recorded sequentially from the head thereof from the second start position which is away behind the first start position by the predetermined value, and an end portion of the second data corresponding to the predetermined value is recorded before the second start position in the recording area.

3. The information recording medium according to claim 1, wherein the predetermined modulating method is a spread spectrum modulating method.

4. An information reproducing apparatus for reproducing information recorded on an information recording medium, on which a record mark having a variable length according to first data is formed at a displaced position to which the record mark is displaced, in a direction crossing a reading direction of the record mark, according to a wobble signal obtained by modulating second data in a predetermined modulating method, wherein a first start position at which a head of the first data is recorded is away in the reading direction of the record mark from a second start position at which a head of the second data is recorded by a predetermined constant value, the first start position is a start position of an error correction unit of the first data, the second start position is a start position of an error correction unit of the second data, a first synchronization signal for the first data is recorded at the first start position, and a second synchronization signal for the second data is recorded at the second start position, said information reproducing apparatus comprising:

a reading device for reading the record mark recorded on said information recording medium;

a read signal generating device for generating a read signal for indicating the variable length of the record mark on the basis of an output signal from said reading device;

a first data reproducing device for reproducing the first data on the basis of the read signal;

a wobble signal generating device for generating the wobble signal for indicating the displaced position of the record mark on the basis of the output signal from said reading device;

a second data reproducing device for reproducing the second data from the generated wobble signal; and an authenticity judging device for detecting a time difference or a data amount between a head of the reproduced first data and a head of the reproduced second data, comparing the detected time difference or the detected data amount with a time length or a data amount corresponding to the predetermined value, and judging authenticity of said information recording medium on the basis of a comparison result.

5. The information reproducing apparatus according to claim 4, further comprising a data reproduction restricting device for restricting reproduction of the first data by said first data reproducing device and reproduction of the second data by said second data reproducing device if said information recording medium is judged to be false by said authenticity judging device.

6. The information reproducing apparatus according to claim 4, wherein said information recording medium comprises a recording area in which the first data is recorded sequentially from the head thereof as the first start position, and the second data is recorded sequentially from the head thereof from the second start position which is away behind the first start position by the predetermined value, and an end portion of the second data corresponding to the predetermined value is recorded before the second start position in the recording area, and said information reproducing apparatus further comprises a second data rearranging device for rearranging an order of the reproduced second data on the basis of the predetermined value so as to return the end portion of the second data, which is replaced and recorded before the second start position, to an original position.

7. An information reproducing method of reproducing information recorded on an information recording medium, on which a record mark having a variable length according to first data is formed at a displaced position to which the record mark is displaced, in a direction crossing a reading direction of the record mark, according to a wobble signal obtained by modulating second data in a predetermined modulating method, wherein a first start position at which a head of the first data is recorded is away in the reading direction of the record mark from a second start position at which a head of the second data is recorded by a predetermined constant value, the first start position is a start position of an error correction unit of the first data, the second start position is a start position of an error correction unit of the second data, a first synchronization signal for the first data is recorded at the first start position, and a second synchronization signal for the second data is recorded at the second start position, said information reproducing method comprising:

a reading process of reading the record mark recorded on said information recording medium;

a read signal generating process of generating a read signal for indicating the variable length of the record mark on the basis of an output signal in said reading process;

a first data reproducing process of reproducing the first data on the basis of the read signal;

a wobble signal generating process of generating the wobble signal for indicating the displaced position of the record mark on the basis of the output signal in said reading process;

a second data reproducing process of reproducing the second data from the generated wobble signal; and an authenticity judging process of detecting a time difference or a data amount between a head of the reproduced first data and a head of the reproduced second data, comparing the detected time difference or the detected data amount with a time length or a data amount corresponding to the predetermined value, and judging authenticity of said information recording medium on the basis of a comparison result.

* * * * *